(12) United States Patent
Oozeki

(10) Patent No.: US 7,876,449 B2
(45) Date of Patent: Jan. 25, 2011

(54) LASER INTERFEROMETER

(75) Inventor: Hidekazu Oozeki, Tsukuba (JP)

(73) Assignee: Mitutoyo Corporation, Kawasaki-shi (JP)

( * ) Notice: Subject to any disclaimer, the term of this patent is extended or adjusted under 35 U.S.C. 154(b) by 0 days.

(21) Appl. No.: 12/654,685

(22) Filed: Dec. 29, 2009

(65) Prior Publication Data
US 2010/0177318 A1 Jul. 15, 2010

(30) Foreign Application Priority Data
Jan. 13, 2009 (JP) ............................. 2009-004717

(51) Int. Cl.
*G01B 9/02* (2006.01)
(52) U.S. Cl. ....................... 356/486; 356/498
(58) Field of Classification Search ................. 356/486, 356/498, 482, 493
See application file for complete search history.

(56) References Cited

U.S. PATENT DOCUMENTS

2007/0008995 A1* 1/2007 Oozeki et al. .......... 372/29.011

FOREIGN PATENT DOCUMENTS

| JP | A-2-22503 | 1/1990 |
| JP | A-2001-274495 | 10/2001 |

* cited by examiner

*Primary Examiner*—Tarifur Chowdhury
*Assistant Examiner*—Jonathan M Hansen
(74) *Attorney, Agent, or Firm*—Oliff & Berridge, PLC

(57) ABSTRACT

A laser interferometer includes: a laser source for emitting a laser beam while stabilizing a center wavelength of the laser beam by modulating the laser beam using a modulation signal of a predetermined frequency; and a reference mirror and a measurement mirror for reflecting the laser beam. The laser interferometer further includes: a sampling unit for acquiring a sampling value by sampling interference light reflected by the reference mirror and the measurement mirror with a sampling frequency that is a multiple by an integer of two or more of a frequency of the modulation signal; and an average calculator for calculating an average value by averaging a time-series sampling value acquired by the sampling unit in accordance with the sampling frequency. The laser interferometer calculates a displacement of the measurement mirror based on the average value calculated by the average calculator.

3 Claims, 11 Drawing Sheets

LASER INTERFEROMETER

The entire disclosure of Japanese Patent Application No. 2009-004717, filed Jan. 13, 2009, is expressly incorporated by reference herein.

BACKGROUND OF THE INVENTION

1. Field of the Invention

The present invention relates to a laser interferometer, more particularly to a laser interferometer with a laser source that emits a laser beam while stabilizing a center wavelength of the laser beam by modulating the laser beam using a modulation signal of a predetermined frequency.

2. Description of Related Art

A traditionally-known Michelson-type interferometer includes: a laser source for irradiating a laser beam; a reference surface provided at a predetermined position for reflecting the laser beam; and a measurement surface provided on a target object for reflecting the laser beam. The Michelson-type interferometer measures a displacement of the target object by calculating a displacement of the measurement surface based on interference light reflected by the reference surface and the measurement surface (for example, Document 1: JP-A-02-22503).

Such an interferometer includes a sampling unit for acquiring a sampling value by converting the intensity of the interference light into an electric signal and sampling the converted electric signal. The interferometer calculates a displacement of the measurement surface based on the sampling value acquired by the sampling unit and a center wavelength of the laser beam. Thus, a laser source for emitting a laser beam having a highly stable center wavelength is required.

As such a laser source, an iodine-stabilized laser source has been known (for example, Document 2: JP-A-2001-274495).

The iodine-stabilized laser source disclosed in Document 2 detects a saturable absorption line of iodine by modulating the laser beam in accordance with a modulation signal and emits the laser beam while stabilizing a center wavelength of the laser beam.

The modulation signal is superimposed on the emitted laser beam, so that the wavelength of the laser beam slightly fluctuates around the center wavelength. When a sampling value is acquired by a laser interferometer having such a laser source (hereinafter referred to as a modulated laser source) while a wavelength of the laser beam is different from a center wavelength, calculation error of a displacement of the measurement surface is caused and thus measurement error of the displacement of the target object is resulted.

Thus, an iodine-stabilized laser source with external modulation in which a modulated signal is not superimposed on an emitted laser beam (hereinafter referred to as non-modulated laser source) may be as applied to a laser interferometer. However, the non-modulated laser source is more expensive than the modulated laser source and is required to be connected to a modulation element such as an AOM (acousto-optic modulator) and an EOM (electro-optic modulator) for external modulation. Accordingly, an arrangement of a laser interferometer becomes complicated.

Therefore, it has been desired to reduce a measurement error in a laser interferometer having a modulated laser source.

In this context, a sampling value may be acquired when a wavelength of the laser beam is at a center wavelength by synchronizing a modulation signal of a laser source to reduce measurement error (hereinafter referred to as frequency synchronization method).

FIGS. 11A and 11B are graphs each showing a relationship between a timing signal for acquiring a sampling value and a modulation component contained in the laser beam. In FIGS. 11A and 11B, a graph GM represents the timing signal and a graph GL represents the modulation component contained in the laser beam. In addition, a vertical axis represents a voltage of the timing signal and a deviation of a wavelength of the laser beam from a center wavelength (hereinafter referred to as wavelength deviation) and a horizontal axis represents time.

The wavelength of the laser beam is varied in a cycle TL by the modulation component contained in the laser beam.

Incidentally, a laser interferometer performs sampling at the rise of the timing signal from an L level to an H level.

The interference light is sampled in synchronization with the timing signal while the modulation cycle TL of the laser beam is equal to a cycle TT of the timing signal. When a phase difference between the timing signal and the modulation component contained in the laser beam is 0 degree, the laser interferometer can acquire a sampling value when a wavelength of the laser beam is at a center wavelength as shown in FIG. 11A.

However, when the phase difference between the timing signal and the modulation component contained in the laser beam is 90 degrees, for instance, the laser interferometer cannot acquire a sampling value when the wavelength of the laser beam is at the center wavelength.

The cause of the phase difference between the timing signal and the modulation component contained in the laser beam is attributed to, for instance, the phase difference between the modulation signal and the modulation component contained in the laser beam on account of frequency characteristics of an element modulating the laser beam in the modulated laser source or the phase difference between the timing signal and the sampling value on account of a delay time of an ADC (analog to digital converter) for sampling the interference light in the sampling unit. Incidentally, the phase difference caused by the delay time of the ADC will not be considered in the following description.

According to the frequency synchronization method, when there is a phase difference between the timing signal and the modulation component contained in the laser beam, the sampling value is acquired when the wavelength of the laser beam is not at the center wavelength, thus failing to reduce the measurement error.

SUMMARY OF THE INVENTION

An object of the invention is to provide a laser interferometer capable of reducing manufacturing cost and simplifying an arrangement.

A laser interferometer according to an aspect of the invention includes: a laser source for emitting a laser beam, a reference surface provided at a predetermined position for reflecting the laser beam; and a measurement surface provided on a target object for reflecting the laser beam, the laser interferometer measuring a displacement of the target object by calculating a displacement of the measurement surface based on an interference light reflected by the reference surface and the measurement surface, in which the laser source emits the laser beam while stabilizing a center wavelength of the laser beam by modulating the laser beam using a modulation signal of a predetermined frequency, the laser interferometer further including: a sampling unit that acquires a sampling value by sampling the interference light in accordance with a sampling frequency that is a multiple of an integer of two or more of a frequency of the modulation signal; and an average calculator that calculates an average value by averaging the sampling value in time-series acquired by the sampling unit in accordance with the sampling frequency, a displacement of the measurement surface being measured based on the average value calculated by the average calculator.

For example, it is assumed that the timing signal is a square-wave signal, the modulation component contained in the laser beam is a sine-wave, and a phase difference between the timing signal and the modulation component contained in the laser beam is 90 degrees. At this time, when a sampling value is acquired in synchronization with the timing signal, the wavelength of the laser beam when the sampling value is acquired maximized or minimized because the timing signal and the modulation component contained in the laser beam have the same frequency. Accordingly, a wavelength deviation is maximized (see FIG. 11B). Thus, the laser interferometer acquires the sampling value while the wavelength of the laser beam is different from the center wavelength, so that calculation error of the displacement of the measurement surface occurs and thus measurement error of the displacement of a target object is resulted.

On the other hand, when a sampling value is sampled by setting the frequency of the timing signal (sampling frequency) to be twice as the frequency of the modulation signal, the wavelength of the laser beam when one of two adjacent sampling values is acquired is maximized and the wavelength of the laser beam when the other sampling value is acquired is minimized. Accordingly, an average value calculated by averaging the two adjacent sampling values is equal to the sampling value acquired when the wavelength of the laser beam is at the center wavelength. Thus, measurement error can be reduced.

The number of the sampling values to be averaged depends on the sampling frequency. For example, when double sampling frequency is used, two sampling values are averaged. When sampling frequency of a multiple of integer a is used, a multiple sampling values of the integer a are averaged.

According to the aspect of the invention, the laser interferometer includes the modulated laser source, the sampling unit and the average calculator. Accordingly, even when there is a phase difference between the timing signal and the modulation component contained in the laser beam, measurement error can be reduced. Thus, manufacturing cost of the laser interferometer can be reduced and the arrangement thereof can be simplified.

In the above aspect of the invention, the average calculator preferably calculates an average value every time the sampling unit acquires sampling values of a number corresponding to the sampling frequency.

With the above arrangement, the same advantages can be attained as in the above-described laser interferometer.

In the above aspect of the invention, the average calculator preferably calculates a moving average value of intervals corresponding to the sampling frequency.

According to the above-described method in which an average value is calculated every time sampling values of a number corresponding to the sampling frequency are acquired by the sampling unit, the average calculator cannot calculate the average value until sampling values of the number corresponding to the sampling frequency are acquired. It takes considerable time to calculate the average value.

Since the average calculator calculates the average value by calculating the moving average value of intervals corresponding to the sampling frequency, calculating speed of the average value can be increased as compared to the above-described method. Thus, measuring speed of the laser interferometer can be increased.

DETAILED DESCRIPTION OF PREFERRED EMBODIMENT(S)

First Exemplary Embodiment

A first exemplary embodiment of the invention will be described below with reference to the accompanying drawings.

[Arrangement of Laser Interferometer]

Figure 1:
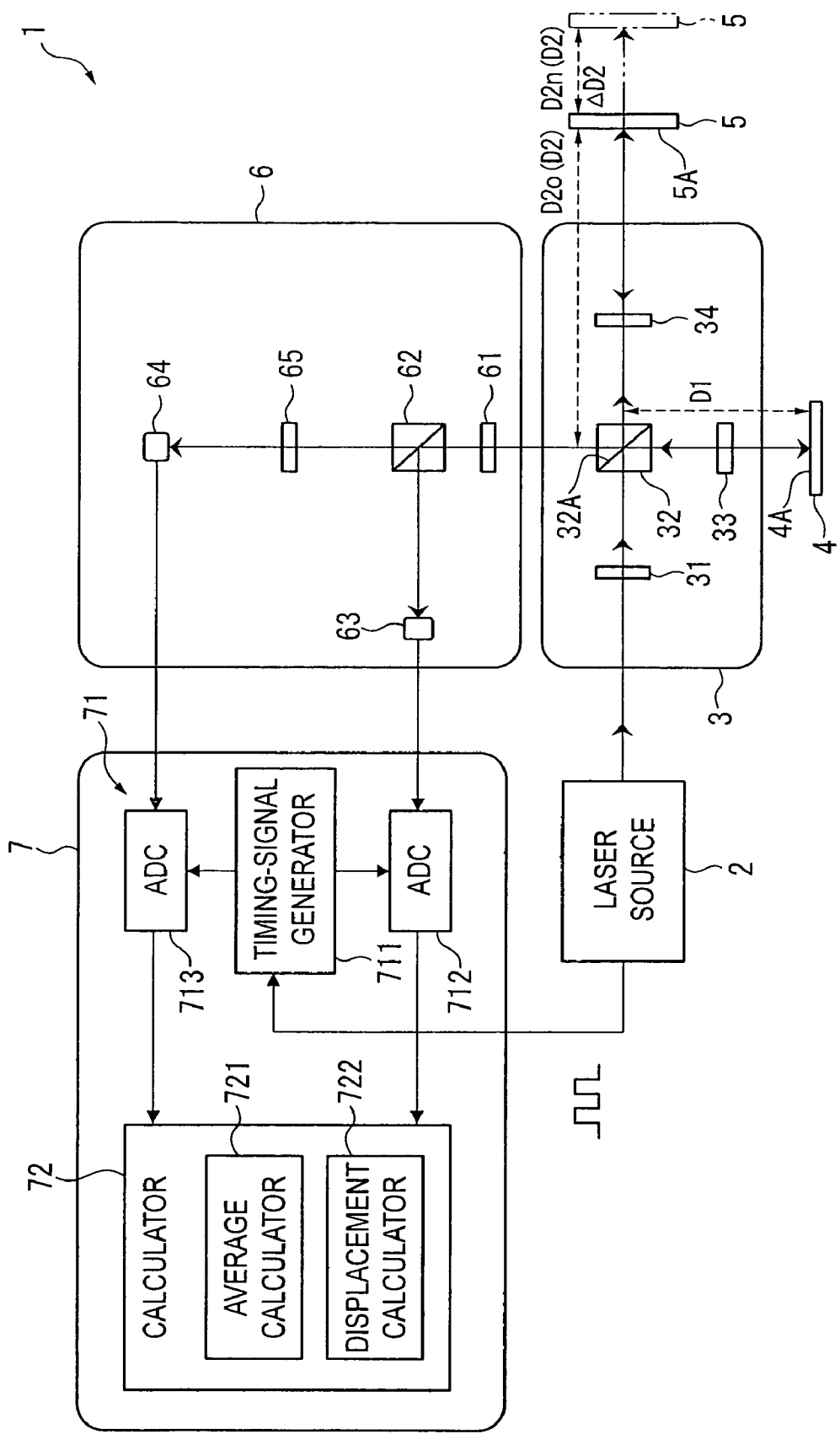
FIG. 1 schematically shows a laser interferometer according to a first exemplary embodiment of the invention.

FIG. 1 schematically shows a laser interferometer 1 according to the first exemplary embodiment of the invention.

As shown in FIG. 1, the laser interferometer 1 includes: a laser source 2 for emitting a laser beam; a light-guiding unit 3 for guiding the laser beam emitted from the laser source 2; a reference mirror 4 and a measurement mirror 5 for reflecting the laser beam passing through the light-guiding unit 3; a light-detecting unit 6 for receiving light passing through the light-guiding unit 3 and reflected by the reference mirror 4 and the measurement mirror 5; and a measuring unit 7 for measuring a displacement of a target object (not shown) by calculating a displacement of the measurement mirror 5 based on the light received by the light-detecting unit 6. In FIG. 1, an optical axis of the laser beam emitted from the laser source 2 and reaching to the light-detecting unit 6 is represented by a solid line.

The laser source 2 is provided by an iodine-stabilized laser for emitting the laser beam by stabilizing a center wavelength of the laser beam by modulating the laser beam with a modulation signal of a predetermined frequency. The laser source 2 outputs to the measuring unit 7 a square-wave signal having the same frequency as the modulation signal.

The reference mirror 4 is provided at a predetermined position and has a reference surface 4A for reflecting the laser beam.

The measurement mirror 5 is attached to the target object and has a measurement surface 5A for reflecting the laser beam.

The light-guiding unit 3 includes: a polarizer 31 provided downstream of an optical path of the laser source 2 for emitting incident laser beam while aligning polarizing directions thereof; a polarization beam splitter 32 for dividing the laser beam emitted from the polarizer 31 and guiding the divided laser beam to the reference mirror 4 and the measurement mirror 5 while guiding interference light provided by combining light reflected by the reference mirror 4 and the measurement mirror 5; and two quarter-wave plates 33 and 34 provided between the polarization beam splitter 32 and the reference mirror 4 and between the polarization beam splitter 32 and the measurement mirror 5.

The polarization beam splitter 32 has a polarization-separating film 32A for transmitting P-polarized light and reflecting S-polarized light relative to the polarization-separating film 32A. Accordingly, the polarization beam splitter 32 guides the S-polarized light out of the laser beam emitted from the polarizer 31 to the reference mirror 4 and guides the P-polarized light to the measurement mirror 5.

The light guided to the reference mirror 4 from the polarization beam splitter 32 (hereinafter referred to as reference light) is reflected by the reference surface 4A and is incident again on the polarization beam splitter 32. The reference light passes through the quarter-wave plate 33 twice, so that the polarizing direction of the light rotates up to 90 degrees and the reference light becomes P-polarized light relative to the polarization-separating film 32A. Accordingly, the reference light passes through the polarization-separating film 32A and is irradiated to the light-detecting unit 6.

The light guided to the measurement mirror 5 from the polarization beam splitter 32 (hereinafter referred to as measurement light) is reflected by the measurement surface 5A and is incident again on the polarization beam splitter 32. The measurement light passes through the quarter-wave plate 34 twice, so that the polarizing direction of the light rotates up to 90 degrees and the measurement light becomes S-polarized light relative to the polarization-separating film 32A. Accordingly, the measurement light is reflected by the polarization-separating film 32A and is irradiated to the light-detecting unit 6.

Thus, the polarization beam splitter 32 irradiates interference light provided by combining the reference light and the measurement light to the light-detecting unit 6.

The light-detecting unit 6 includes: a half-wave plate 61 provided downstream of an optical path of the polarization beam splitter 32 for irradiating the incident interference light while rotating a polarizing direction of the like in a predetermined direction; a non-polarization beam splitter 62 for dividing the light irradiated from the half-wave retardation plate 61; two photoelectric transducers 63 and 64 for receiving the light irradiated from the non-polarization beam splitter 62 and converting the light into an electric signal; and a quarter-wave plate 65 provided between the non-polarization beam splitter 62 and the photoelectric transducer 64, quarter-wave plate 65 delaying a phase difference of the incident interference light by 90 degrees.

The measuring unit 7 includes: a sampling unit 71 for sampling the interference light converted to the electric signal by the photoelectric transducers 63 and 64 to acquire a sampling value; and a calculator 72 for calculating a displacement of the measurement mirror 5 based on the sampling value acquired by the sampling unit 71.

The sampling unit 71 includes: a timing-signal generator 711 for generating a predetermined timing signal based on a square-wave signal having the same frequency as a modulation signal outputted from the laser source 2; and ADC 712, 713 for sampling the interference light converted to the electric signal by the photoelectric transducer 63, 64 to acquire a sampling value based on the timing signal outputted from the timing-signal generator 711.

For outputting a timing signal having a larger frequency than a frequency of the modulation signal, the timing-signal generator 711 outputs the timing signal by multiplying the above-described square-wave signal. For outputting a timing signal having a smaller frequency than a frequency of the modulation signal, the timing-signal generator 711 outputs the timing signal by dividing the square-wave signal.

Figure 2:
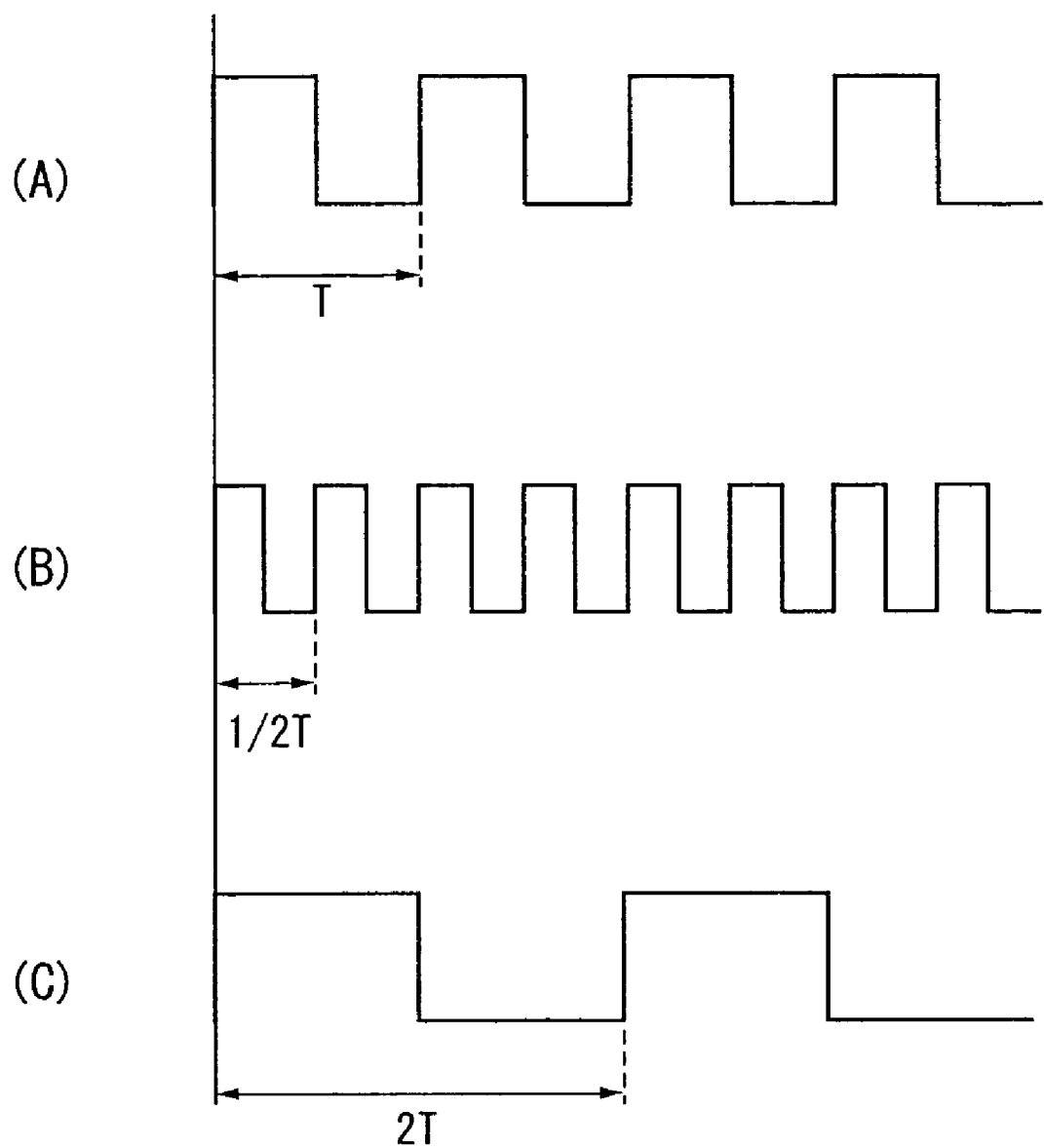
FIG. 2 is a graph showing a relationship between a modulation signal and a timing signal according to the first exemplary embodiment.

FIG. 2 is a graph showing a relationship between the square-wave signal and the timing signal. In FIG. 2, a vertical axis represents the modulation signal and the timing signal, and a horizontal axis represents time. FIG. 2(A) is a graph showing the square-wave signal, and FIGS. 2(B) and 2(C) are graphs showing an example of the timing signal.

Specifically, when a cycle of the square-wave signal outputted from the laser source 2 is denoted by T (see FIG. 2(A)), a cycle of the timing signal when the square-wave signal is doubled by the timing-signal generator 711 is (½)×T (see FIG. 2(B)).

Also, a cycle of the timing signal when the square-wave signal is half divided by the timing-signal generator 711 is 2T (FIG. 2(C)).

In this exemplary embodiment, the timing-signal generator 711 outputs the timing signal when the square-wave signal is doubled (see FIG. 2(B)). Accordingly, ADC 712, 713 acquires a sampling value by sampling interference light with a sampling frequency that is twice as high as the frequency of the modulation signal.

Figure 3A:
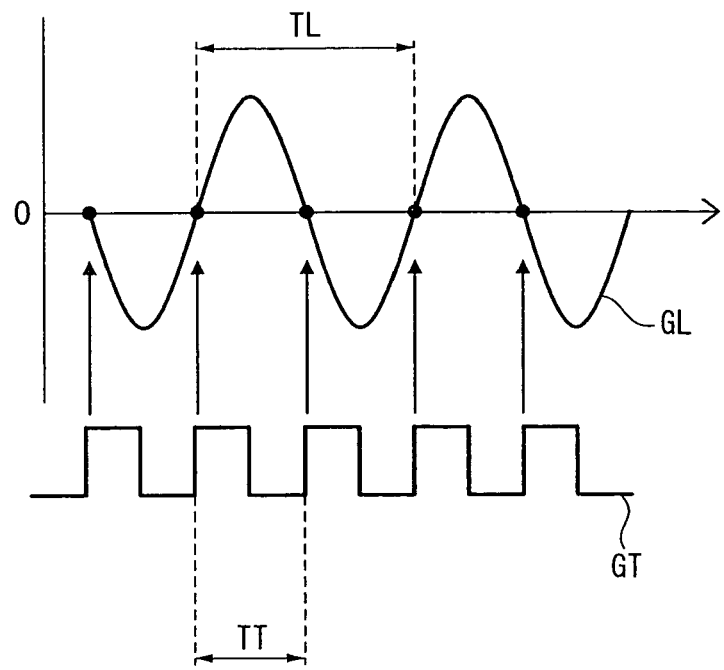
FIG. 3A is a graph showing a relationship between the timing signal and a modulation component contained in a laser beam according to the first exemplary embodiment.
Figure 3B:
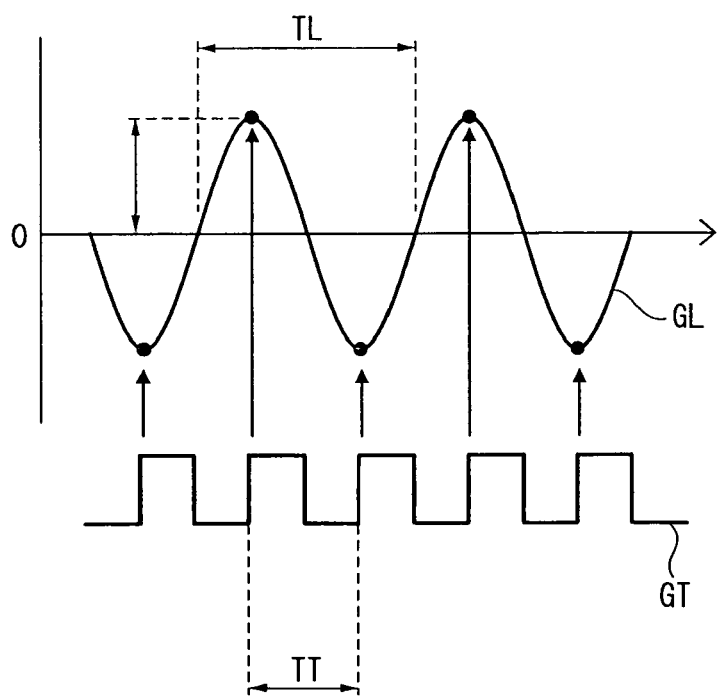
FIG. 3B is a graph showing a relationship between the timing signal and the modulation component contained in the laser beam according to the first exemplary embodiment.

FIGS. 3A and 3B are graphs showing a relationship between the timing signal and the modulation component contained in the laser beam. In FIGS. 3A and 3B, a graph GT represents the timing signal, a graph GL represents the modulation component contained in the laser beam, TT represents a cycle for sampling interference light, and TL represents a cycle of the modulation component contained in the laser beam. A vertical axis represents voltage of the timing signal and wavelength deviation, and a horizontal axis represents time.

For example, when the phase difference between the timing signal and the modulation component contained in the laser beam is 0 degree, the sampling unit 71 acquires a sampling value by sampling the interference light when the wavelength of the laser beam is at the center wavelength as shown in FIG. 3A.

When the phase difference between the timing signal and the modulation component contained in the laser beam is 90 degree, the sampling unit 71 acquires a sampling value by sampling the interference light when the wavelength of the laser beam is the maximum value or the minimum value as shown in FIG. 3B.

The calculator 72 is provided by an average calculator 721 and a displacement calculator 722 as shown in FIG. 1.

The average calculator 721 calculates an average value by averaging a time-series sampling value acquired by the sampling unit 71 in accordance with a sampling frequency of the sampling unit 71, i.e., a frequency of the timing signal.

Because the timing signal is outputted by doubling the square-wave signal, the average calculator 721 calculates an average value $D_k$ every time the sampling unit 71 acquires two sampling values $d_{2k-1}$ and $d_{2k}$ as represented by the following formula (1).

$$D_k = \frac{d_{2k-1} + d_{2k}}{2} (k = 1, 2, 3 \ldots, n/2) \quad (1)$$

Figure 4A:
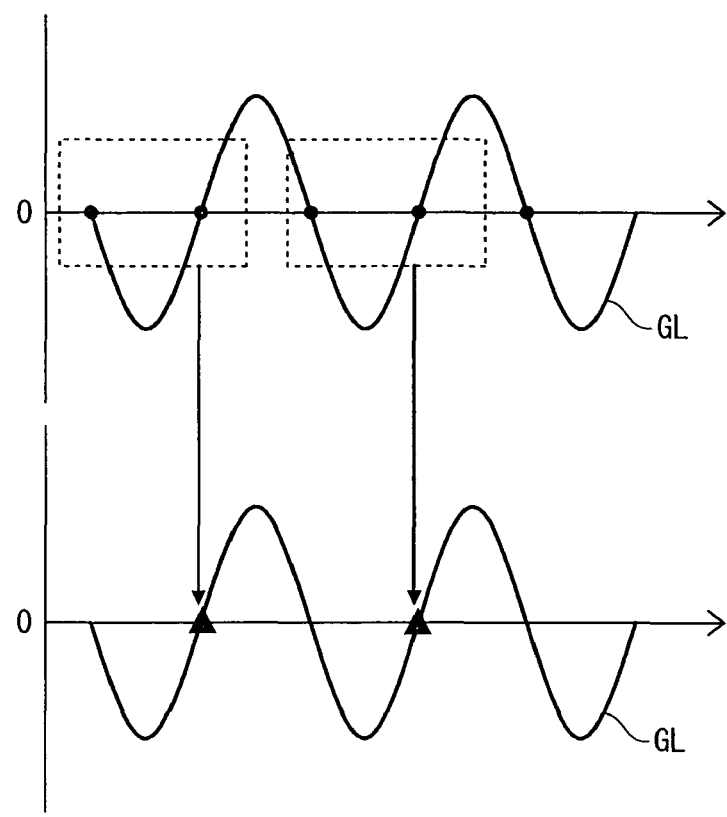
FIG. 4A shows a relationship between a wavelength of the laser beam when a sampling value is acquired and a wavelength of the laser beam when an average value is calculated according to the first exemplary embodiment.
Figure 4B:
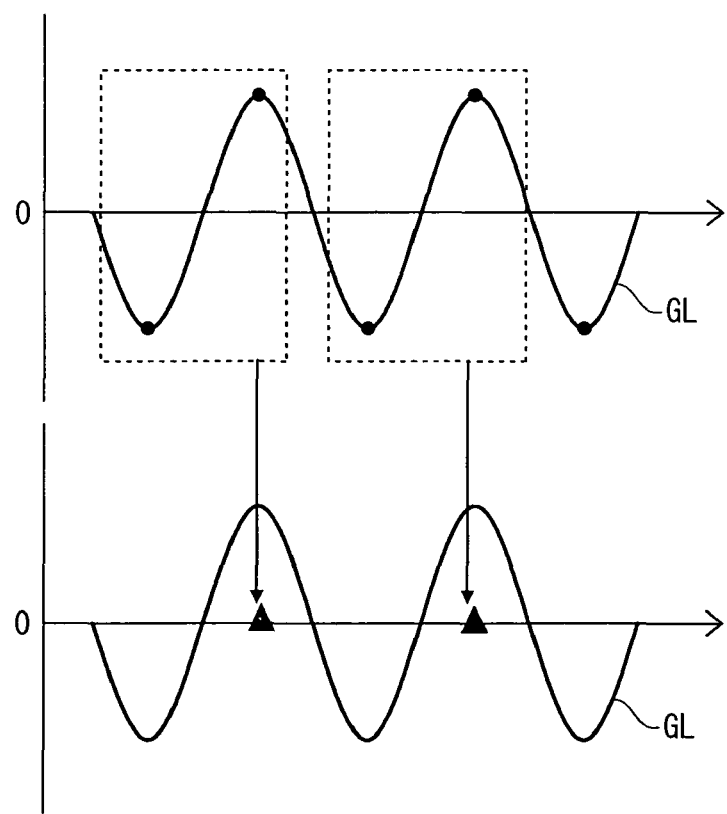
FIG. 4B shows the relationship between the wavelength of the laser beam when the sampling value is acquired and the wavelength of the laser beam when the average value is calculated according to the first exemplary embodiment.

FIGS. 4A and 4B show a relationship between a wavelength of the laser beam when the sampling value is acquired and a wavelength of the laser beam when the average value is calculated. In FIGS. 4A and 4B, a graph GL represents the wavelength of the laser beam, a vertical axis represents a wavelength deviation, and a horizontal axis represents time. Also, in FIGS. 4A and 4B, upper figures show the wavelength of the laser beam when the sampling value is acquired by the sampling unit 71 (circle marks) and lower figures show the wavelength of the laser beam when the average value is calculated by the average calculator 721 (triangular marks).

When the phase difference between the timing signal and the modulation component contained in the laser beam is 0 degree, the sampling unit 71 acquires the sampling value by sampling the interference light when the wavelength of the laser beam is at the center wavelength as shown in FIG. 4A.

When the phase difference between the timing signal and the modulation component contained in the laser beam is 90 degree, the sampling unit 71 acquires the sampling value by sampling the interference light when the wavelength of the laser beam is the maximum value or the minimum value as shown in FIG. 4B. More specifically, the wavelength of the laser beam when the sampling unit 71 acquires one of two adjacent sampling values is maximized, and the wavelength of the laser beam when the sampling unit 71 acquires the other sampling value is minimized.

Accordingly, a wavelength of the laser beam when the average calculator 721 calculates an average value is at the center wavelength in both of the phase differences between the timing signal and the modulation component contained in the laser beam, i.e. 0 or 90 degrees.

The wavelength deviation when the average calculator 721 calculates the average value and the wavelength deviation when the above-described frequency synchronization method is used will be compared below.

Figure 5:
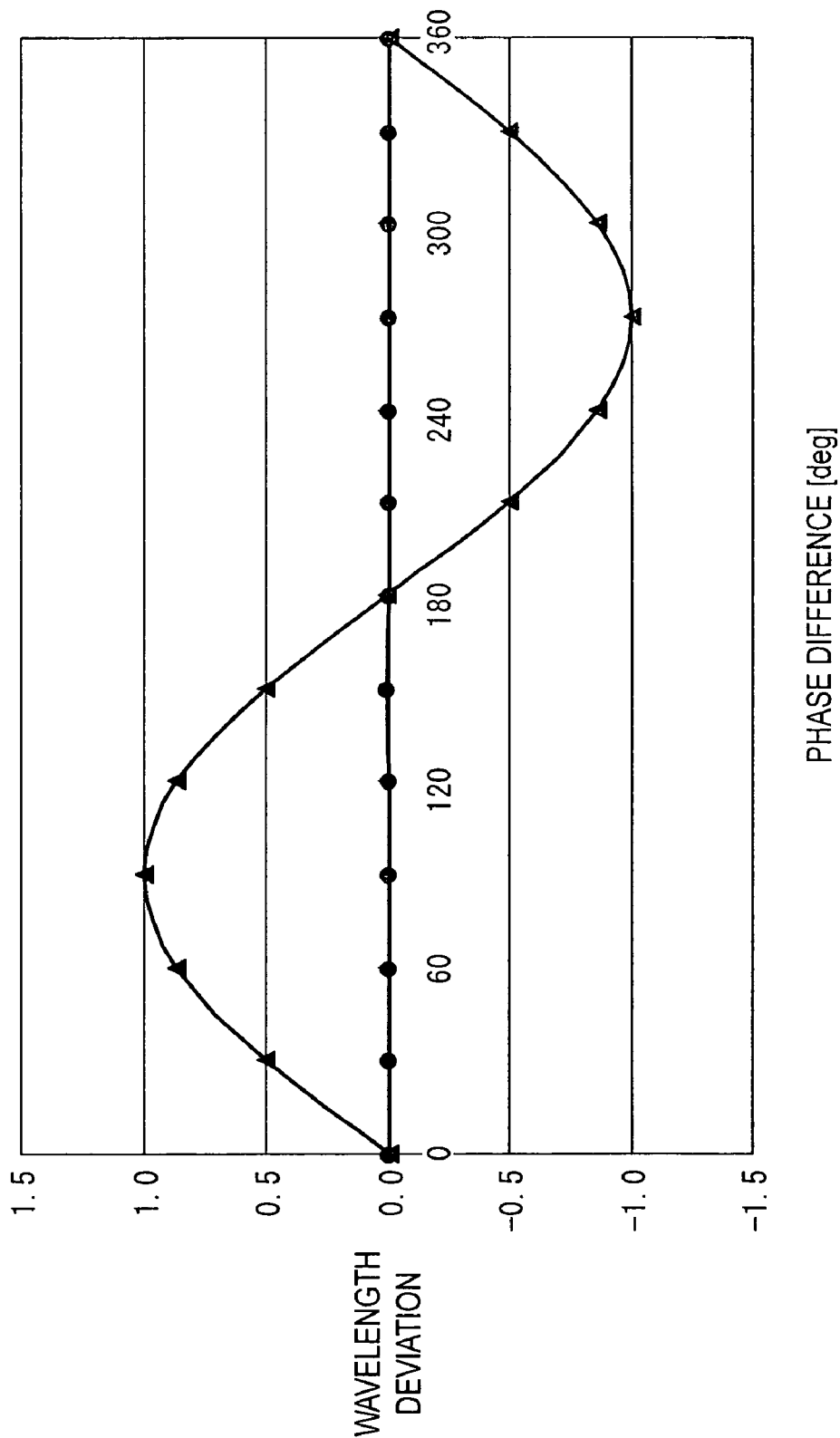
FIG. 5 shows comparison of a wavelength deviation when an average value is calculated by an average calculating unit with a wavelength deviation when a frequency synchronization method is used, where a phase difference between the timing signal and the modulation component contained in the laser beam is 0 to 360 degrees according to the first exemplary embodiment.

FIG. 5 shows comparison of the wavelength deviation when the average calculator 721 calculates the average value with the wavelength deviation when the frequency synchronization method is used, where the phase difference between the timing signal and the modulation component contained in the laser beam ranges from 0 to 360 degrees. In FIG. 5, a vertical axis represents the wavelength and a horizontal axis represents the phase difference. Also, in FIG. 5, the wavelength is normalized with the maximum wavelength deviation being 1.

The wavelength deviation when the frequency synchronization method is used varies in accordance with the phase difference between the timing signal and the modulation component contained in the laser beam as shown in FIG. 5 (triangular marks in FIG. 5).

On the other hand, the wavelength deviation when the average calculator 721 calculates an average value stays at 0 irrespective of the phase difference between the timing signal and the modulation component contained in the laser beam (circular marks in FIG. 5).

Figure 6:
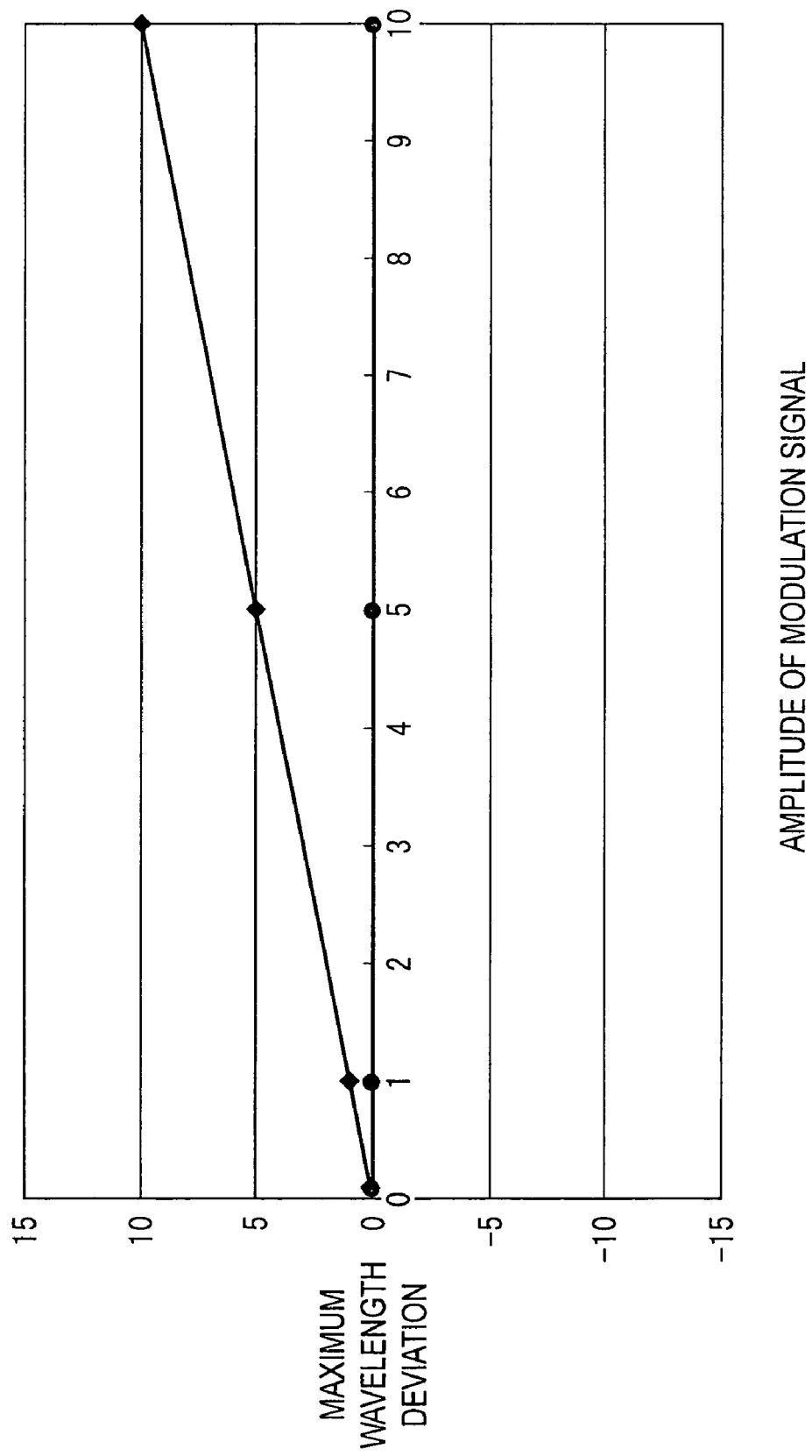
FIG. 6 shows comparison of the wavelength deviation when the average value is calculated by the average calculating unit with the wavelength deviation when the frequency synchronization method is used while varying an amplitude of the modulation signal according to the first exemplary embodiment.

FIG. 6 shows comparison of the wavelength deviation when the average calculator 721 calculates the average value with the wavelength deviation when the frequency synchronization method is used while varying the amplitude of the modulation signal. In FIG. 6, a vertical axis represents the maximum wavelength deviation and a horizontal axis represents the amplitude of the modulation signal.

As shown in FIG. 6, the maximum wavelength deviation when the frequency synchronization method is used becomes larger as the amplitude of the modulation signal is larger (rhombic marks in FIG. 6).

On the other hand, the maximum wavelength deviation when the average calculator 721 calculates the average value is 0 irrespective of the amplification of the modulation signal (circle marks in FIG. 6).

Next, the principle that the wavelength deviation when the average calculator 721 calculates the average value is 0 will be explained.

Wavelength deviations when the sampling unit 71 acquires sampling values $d_{2k-1}$ and $d_{2k}$ are represented by the maximum wavelength deviation $\Delta\lambda$ and the phase difference $\Delta\theta$ as represented by the following formulae (2) and (3).

$$d_{2k-1} = \Delta\lambda \cdot \sin(\Delta\theta) \quad (2)$$

$$d_{2k} = \Delta\lambda \cdot \sin(\Delta\theta - \pi) \quad (3)$$

$$(k=~1,2,3\ldots,n/2)$$

The following formula (3) can be converted using trigonometrical function as represented by the following formula (4). Accordingly, the wavelength deviation when the average calculator 721 calculates an average value $D_k$ is 0 as represented by the following formula (5).

$$d_{2k} = \Delta\lambda \cdot \sin(\Delta\theta - \pi) = -\Delta\lambda \cdot \sin(\Delta\theta) \quad (4)$$

$$D_k = \frac{d_{2k-1} + d_{2k}}{2}$$ (5)

$$= \frac{\Delta\lambda \cdot \sin(\Delta\theta) + \Delta\lambda \cdot \sin(\Delta\theta - \pi)}{2}$$

$$= \frac{\Delta\lambda \cdot \sin(\Delta\theta) - \Delta\lambda \cdot \sin(\Delta\theta)}{2}$$

$$= 0$$

When a magnification relative to the modulation signal of the timing signal is denoted by a, the wavelength deviation when the average calculator 721 calculates the average value is 0 every time the sampling unit 71 acquires a sampling values.

A wavelength deviation when the sampling unit 71 acquires a sampling value $d_{a(k-1)+m+1}$ is represented by the maximum wavelength deviation $\Delta\lambda$ and the phase difference $\Delta\theta$ as represented by the following formula (6).

$$d_{a(k-1)+m+1} = \Delta\lambda \cdot \sin\left(\Delta\theta - \frac{2\pi}{a} \cdot m\right)$$ (6)

$$(k = 1, 2, 3 \ldots, n/a, m = 0, 1, 2 \ldots, a-1)$$

Accordingly, the wavelength deviation when the average calculator 721 calculates the average value $D_k$ is represented by the following formula (7).

$$D_k = \frac{1}{a} \cdot \sum_{m=0}^{a-1} d_{a(k-1)+m+1}$$ (7)

$$= \frac{1}{a} \cdot \sum_{m=0}^{a-1} \Delta\lambda \cdot \sin\left(\Delta\theta - \frac{2\pi}{a} \cdot m\right)$$

$$= \frac{\Delta\lambda}{a} \cdot \sum_{m=0}^{a-1} \sin\left(\Delta\theta - \frac{2\pi}{a} \cdot m\right)$$

Here, Euler's formula as represented by the following formula (8) is substituted into the formula (7), thereby leading to the following formula (9).

$$\sin(\theta) = \frac{e^{i\theta} - e^{-i\theta}}{2i}$$ (8)

$$D_k = \frac{\Delta\lambda}{a} \cdot \sum_{m=0}^{a-1} \sin\left(\Delta\theta - \frac{2\pi}{a} \cdot m\right)$$ (9)

$$= \frac{\Delta\lambda}{a} \cdot \sum_{m=0}^{a-1} \frac{e^{i(\Delta\theta - \frac{2\pi}{a} \cdot m)} - e^{-i(\Delta\theta - \frac{2\pi}{a} \cdot m)}}{2i}$$

$$= \frac{\Delta\lambda}{a \cdot 2i} \cdot \sum_{m=0}^{a-1} (e^{i(\Delta\theta - \frac{2\pi}{a} \cdot m)} - e^{-i(\Delta\theta - \frac{2\pi}{a} \cdot m)})$$

$$= \frac{\Delta\lambda}{a \cdot 2i} \cdot \left(\sum_{m=0}^{a-1} e^{i(\Delta\theta - \frac{2\pi}{a} \cdot m)} - \sum_{m=0}^{a-1} e^{-i(\Delta\theta - \frac{2\pi}{a} \cdot m)}\right)$$

$$= \frac{\Delta\lambda}{a \cdot 2i} \left(e^{i\Delta\theta} \cdot \sum_{m=0}^{a-1} e^{-i\frac{2\pi}{a} \cdot m} - e^{-i\Delta\theta} \cdot \sum_{m=0}^{a-1} e^{i\frac{2\pi}{a} \cdot m}\right)$$

$$= \frac{\Delta\lambda}{a \cdot 2i} \left(e^{i\Delta\theta} \cdot \sum_{m=0}^{a-1} (e^{-i\frac{2\pi}{a}})^m - e^{-i\Delta\theta} \cdot \sum_{m=0}^{a-1} (e^{i\frac{2\pi}{a}})^m\right)$$

Further, the formula of summation of geometrical progression and Euler's formula represented by the following formula (10) are used to derive the following formulae (11) and (12).

$$\sum_{t=0}^{n} P^t = \frac{1 - P^{n+1}}{1 - p}, \quad e^{i \cdot 2\pi} = (e^{i\pi})^2 = (-1)^2 = 1$$ (10)

$$\sum_{m=0}^{a-1} (e^{i\frac{2\pi}{a}})^m = \frac{1 - (e^{i\frac{2\pi}{a}})^a}{1 - e^{i\frac{2\pi}{a}}} = \frac{1 - e^{i \cdot 2\pi}}{1 - e^{i\frac{2\pi}{a}}} = \frac{1-1}{1 - e^{i\frac{2\pi}{a}}} = 0$$ (11)

$$\sum_{m=0}^{a-1} (e^{-i\frac{2\pi}{a}})^m = \frac{1 - (e^{-i\frac{2\pi}{a}})^a}{1 - e^{-i\frac{2\pi}{a}}} = \frac{1 - e^{-i \cdot 2\pi}}{1 - e^{-i\frac{2\pi}{a}}} = \frac{1-1}{1 - e^{-i\frac{2\pi}{a}}} = 0$$ (12)

Then, the formulae (11) and (12) are substituted into the formula (9), thereby leading to the following formula (13).

$$D_k = \frac{\Delta\lambda}{a \cdot 2i} \cdot (e^{i\Delta\theta} \cdot 0 - e^{-i\Delta\theta} \cdot 0) = 0$$ (13)

As represented by the following formula (13), the wavelength deviation when the average calculator 721 calculates the average value $D_k$ is 0 even when the magnification of the timing signal is a.

Figure 7:
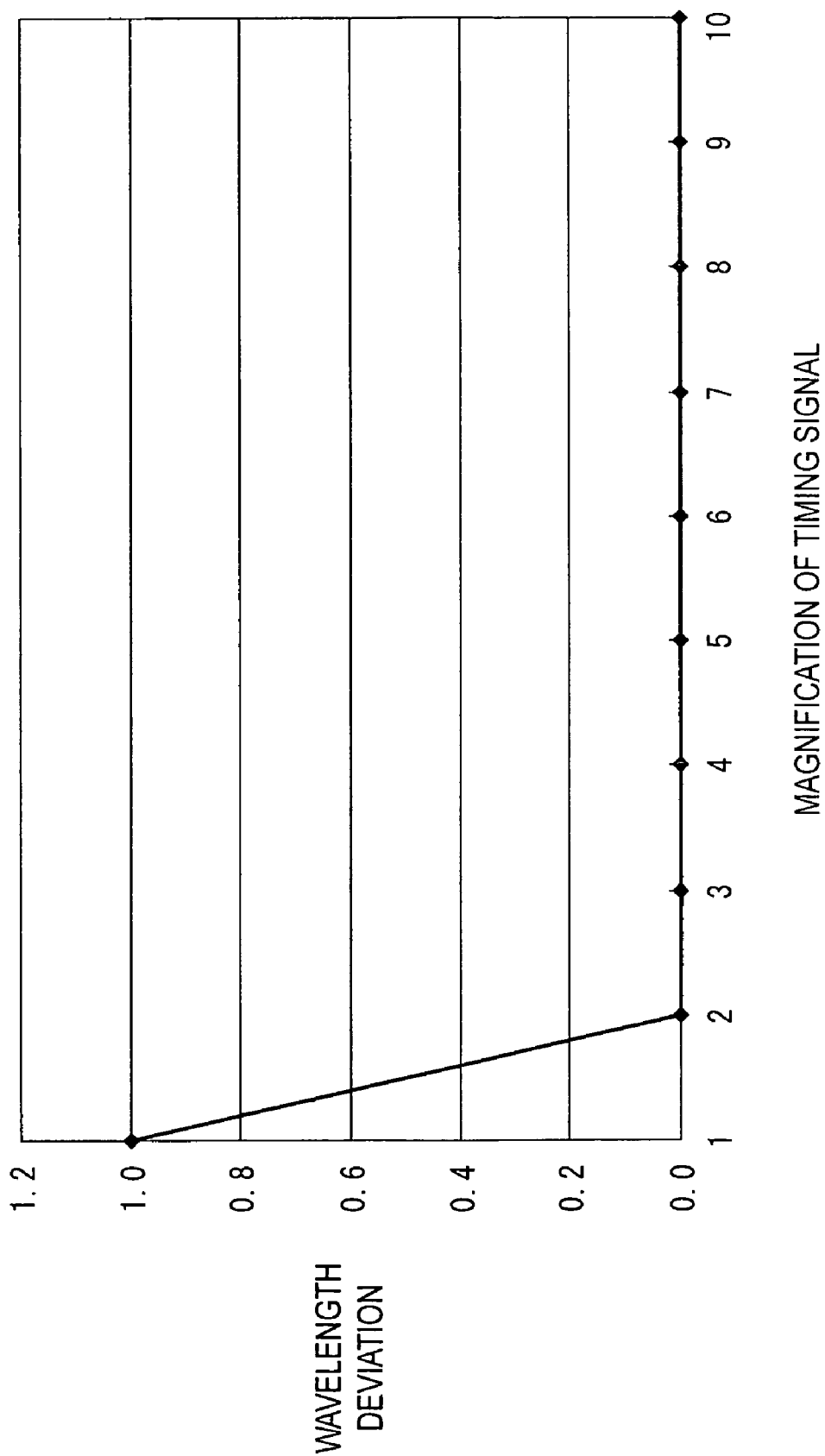
FIG. 7 shows a relationship between a magnification of the timing signal and the wavelength deviation according to the first exemplary embodiment.

FIG. 7 shows a relationship between the magnification of the timing signal and the wavelength deviation. In FIG. 7, a vertical axis represents the wavelength deviation and a horizontal axis represents the magnification of the timing signal. Also, in FIG. 7, the wavelength is normalized with the maximum wavelength deviation being 1.

When the magnification of the timing signal is a multiple of an integer of two or more, the wavelength deviation is 0 as shown in FIG. 7 (rhombic marks in FIG. 7).

The displacement calculator 722 calculates a displacement of the measurement mirror 5 based on the average value $D_k$ calculated by the average calculator 721 and the center wavelength.

How to calculate the displacement of the measurement mirror 5 by the displacement calculator 722 will be explained below.

The brightness of the interference light irradiated from the polarization beam splitter 32 periodically varies in accordance with the change in an optical path difference (D2−D1) between an optical path D1 from the polarization beam splitter 32 to the reference mirror 4 and an optical path D2 from the polarization beam splitter 32 to the measurement mirror 5. Specifically, when the center wavelength of the laser source 2 is 532 nm, the brightness of the interference light periodically varies per a cycle of an optical path difference (266 nm) that is a half of the center wavelength of the laser source 2.

Accordingly, the interference light converted to an electric signal by the photoelectric transducers 63 and 64 is a cyclic signal in accordance with the change in the optical path difference. Thus, an electric signal ϕA converted by the photoelectric transducer 63 and an electric signal ϕB converted by the photoelectric transducer 64 are represented by the following formulae (14) and (15). In the formulae (14) and (15), A and B are amplitudes of the electric signals ϕA and ϕB, and Va and Vb are offset values of the electric signals ϕA and ϕB.

Accordingly, when the amplitudes A and B are normalized and the offset values Va and Vb are removed, the electric signals ϕA' and ϕB' are represented by the following formulae (16) and (17).

$$\phi A = A \sin\theta + V_a$$ (14)

$$\phi B = B \cos\theta + V_b$$ (15)

$$\phi A' = \sin \theta \quad (16)$$

$$\phi B' = \cos \theta \quad (17)$$

Accordingly, the displacement calculator 722 calculates θ in the formulae (16) and (17) based on the electric signals φA' and φB', i.e., the average value $D_k$ calculated by the average calculator 721.

When the optical path difference (D1−D2) is changed by one cycle, θ is changed by 2π. When ½ of the center wavelength of the laser source 2 is $\lambda_i$ and a number of cycles is N, the optical path difference is represented by the following formula (18).

$$D2 - D1 = N \cdot \lambda_i + \frac{\theta}{2\pi}\lambda_i \quad (18)$$

Then, the displacement ΔD2 of the measurement mirror 5 is represented by the following formula (19) when an initial position of the measurement mirror 5 is D2o and a present position is D2n. Accordingly, the displacement ΔD2 of the measurement mirror 5 can be sequentially calculated by sequentially calculating D2n−D1 in the formula (19).

$$\Delta D2 = D2_n - D2_o = (D2_n - D1) - (D2_o - D1) \quad (19)$$

Thus, the displacement calculator 722 calculates the displacement of the measurement mirror 5 based on the average value $D_k$ calculated by the average calculator 721 and the center wavelength.

The following advantages can be attained according to the exemplary embodiment.

(1) Since the laser interferometer 1 includes: the laser source 2 for stabilizing and irradiating the center wavelength of the laser beam by modulating the laser beam using the modulation signal having a predetermined frequency; the sampling unit 71; and the average calculator 721, the measurement error can be reduced even when the phase difference exists between the timing signal and the modulation component contained in the laser beam. Thus, the laser interferometer 1 can reduce manufacturing cost and simplify the arrangement.

Second Exemplary Embodiment

A second exemplary embodiment of the invention will be described below with reference to the accompanying drawings.

Figure 8:
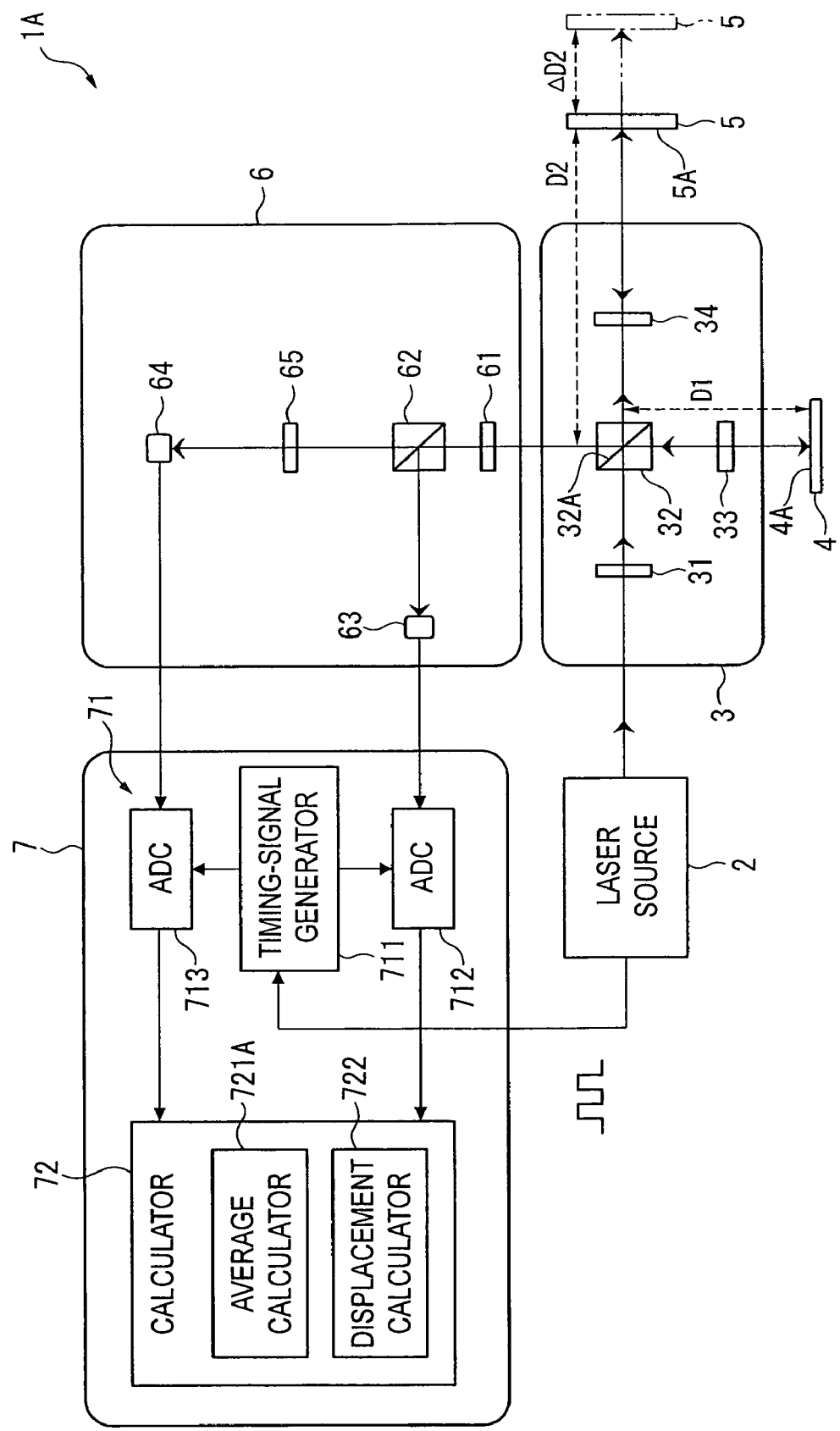
FIG. 8 schematically shows a laser interferometer according to a second exemplary embodiment of the invention.

FIG. 8 schematically shows a laser interferometer 1A according to the second exemplary embodiment of the invention.

In the following description, the same components as those described above will be indicated by the same reference numerals and the description thereof will be omitted.

In the first exemplary embodiment, the laser interferometer 1 includes the average calculator 721 that calculates an average value every time the sampling unit 71 acquires the number of sampling values in accordance with the sampling frequency.

On the other hand, as shown in FIG. 8, the laser interferometer 1A includes the average calculator 721A that calculates a moving average value of intervals corresponding to the sampling frequency.

Specifically, since the timing signal is outputted by doubling the modulation signal, the average calculator 721A calculates a moving average value of intervals corresponding to the sampling frequency, i.e., two sampling values $d_k$ and $d_{k+1}$ as represented by the following formula (20).

$$D_k = \frac{d_k + d_{k+1}}{2} (k = 1, 2, 3 \ldots, n) \quad (20)$$

Figure 9:
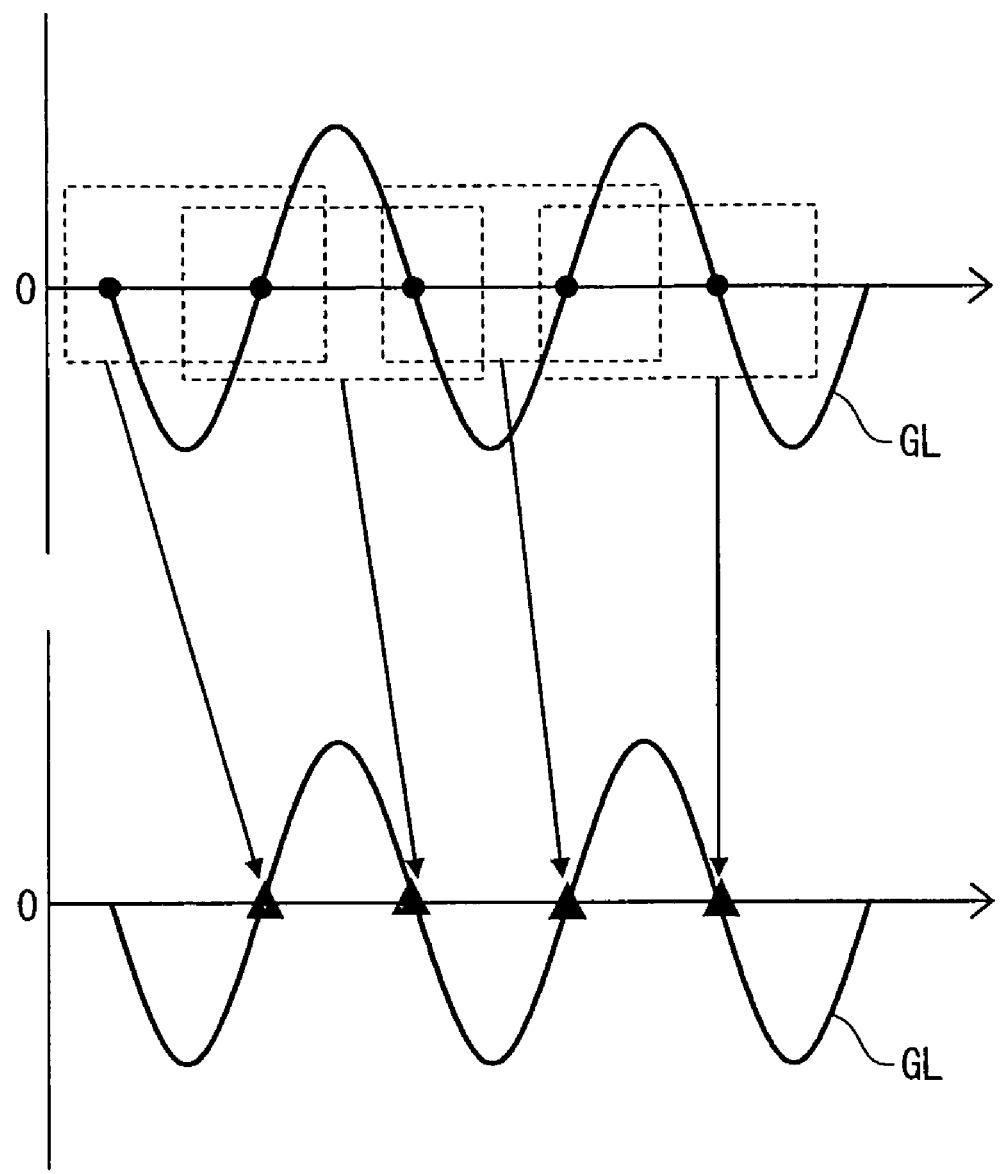
FIG. 9 shows a relationship between a wavelength of a laser beam when a sampling value is acquired and a wavelength of the laser beam when an average value is calculated, where a phase difference between a timing signal and a modulation component contained in the laser beam is 0 degree according to the second exemplary embodiment.
Figure 10:
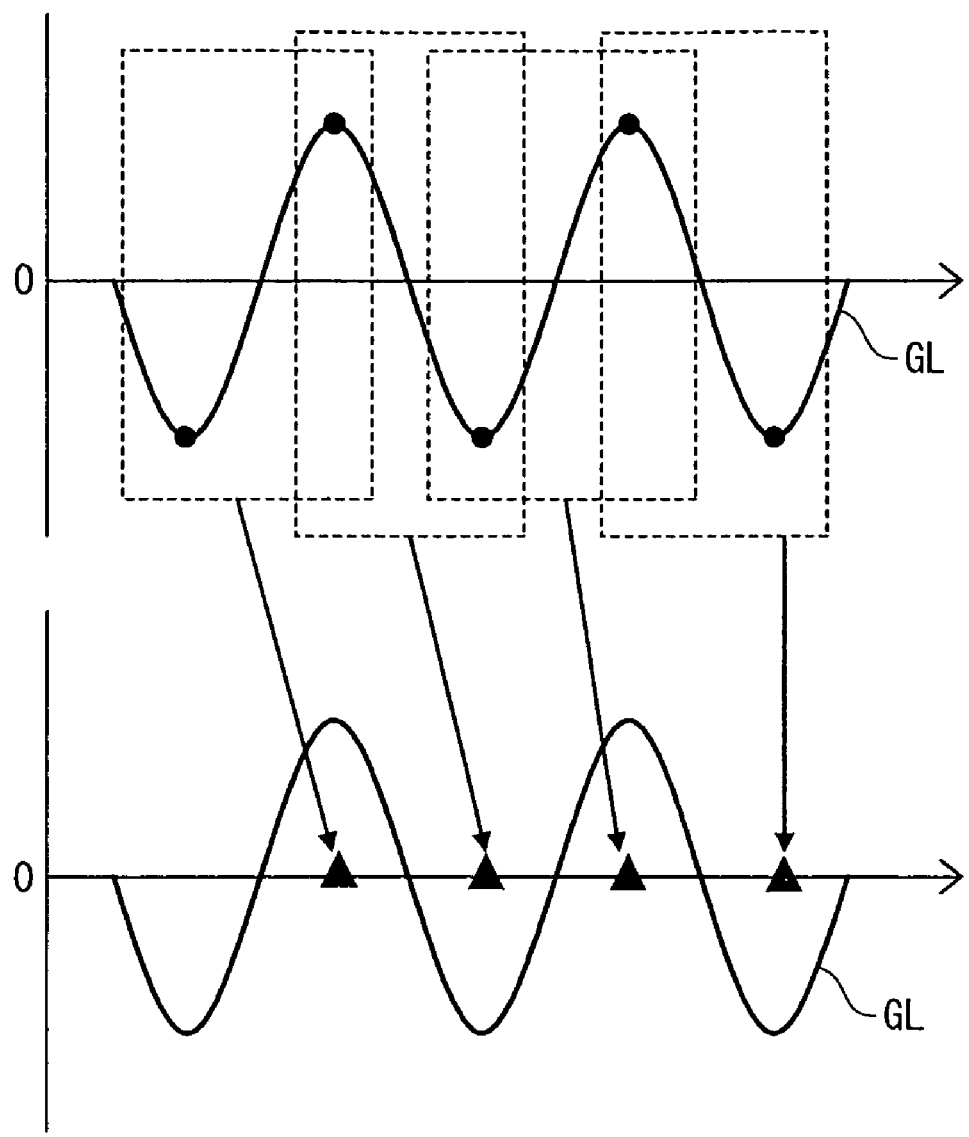
FIG. 10 shows a relationship between a wavelength of the laser beam when a sampling value is acquired and a wavelength of the laser beam when an average value is calculated, where the phase difference between the timing signal and the modulation component contained in the laser beam is 90 degrees according to the second exemplary embodiment.
Figure 11A:
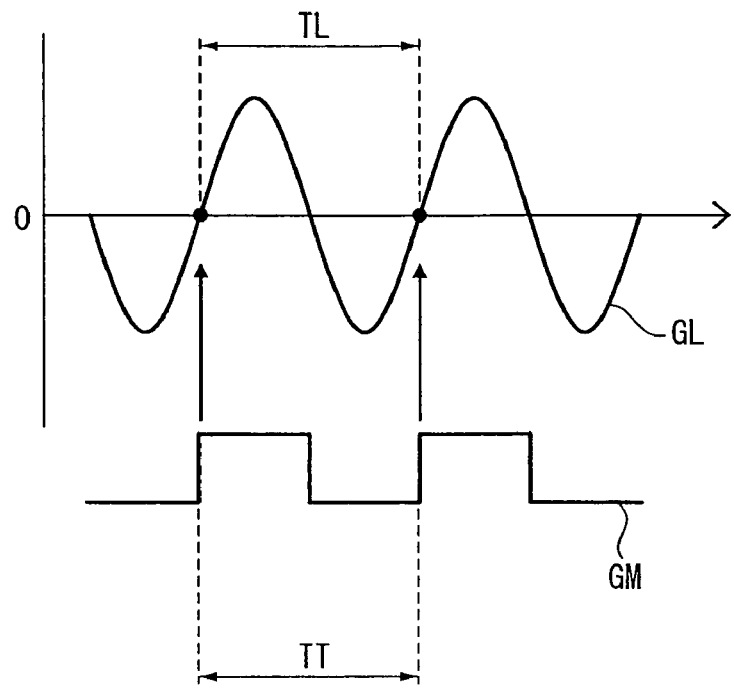
FIG. 11A is a graph showing a relationship between a modulation signal and the modulation component contained in the laser beam.
Figure 11B:
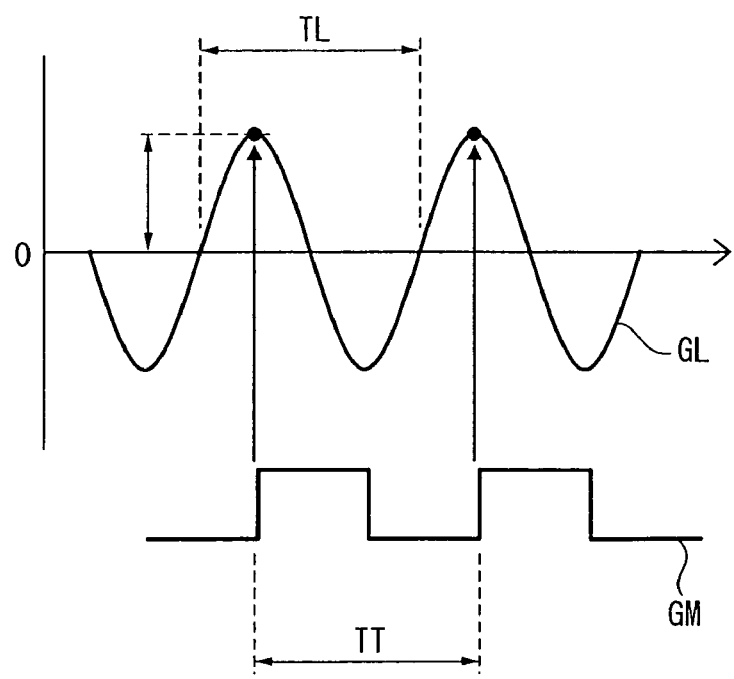
FIG. 11B is a graph showing a relationship between the modulation signal and the modulation component contained in the laser beam.

FIG. 9 shows a relationship between the wavelength of the laser beam when the sampling value is acquired and the wavelength of the laser beam when the average value is calculated, where the phase difference between the timing signal and the modulation component contained in the laser beam is 0 degree. FIG. 10 shows a relationship between the wavelength of the laser beam when the sampling value is acquired and the wavelength of the laser beam when the average value is calculated in a case where the phase difference between the timing signal and the modulation component contained in the laser beam is 90 degrees.

In FIGS. 9 and 10, a graph GL represents the modulation component contained in the laser beam, a vertical axis represents the wavelength deviation and a horizontal axis represents time. Also, in FIGS. 9 and 10, upper figures show the wavelength of the laser beam when the sampling value is acquired by the sampling unit 71 (circle marks) and lower figures show the wavelength of the laser beam when the average value is calculated by the average calculator 721A (triangular marks).

When the phase difference between the timing signal and the modulation component contained in the laser beam is 0 degree, the sampling unit 71 acquires a sampling value by sampling the interference light when the wavelength of the laser beam is at the center wavelength as shown in FIG. 9.

When the phase difference between the timing signal and the modulation component contained in the laser beam is 90 degrees, the sampling unit 71 acquires a sampling value by sampling the interference light when the wavelength of the laser beam is the maximum value and the minimum value as shown in FIG. 10.

Accordingly, the wavelength of the laser beam when the average calculator 721A calculates the moving average value is at the center wavelength when the phase difference between the timing signal and the modulation component contained in the laser beam is either 0 or 90 degrees.

In the second exemplary embodiment, the following advantages can be attained in addition to the advantage as in the first exemplary embodiment.

(2) Since the average calculator 721A calculates the average value by calculating the moving average value of intervals corresponding to the sampling frequency, calculating speed of the average value can be increased as compared to the average calculator 721 in the first exemplary embodiment. Thus, the measurement speed of the laser interferometer 1A can be increased.

MODIFICATION(S) OF EXEMPLARY EMBODIMENT(S)

The invention is not limited to the exemplary embodiments, but includes modifications and improvements as long as an object of the invention can be achieved.

For example, though the magnification of the timing signal relative to the modulation signal is 2 in the exemplary embodiments, the magnification may be a multiple of an integer of 3 or more. In short, it is only required that the sampling unit acquires the sampling value by sampling interference light in accordance with the sampling frequency that is a multiple of an integer of two or more of the frequency of the modulation signal.

In the exemplary embodiments, the average calculator 721 calculates the average value by averaging the time-series sampling value acquired by the sampling unit 71 in accordance with the sampling frequency of the sampling unit 71, and the displacement calculator 722 calculates the displacement of the measurement mirror 5 based on the average value calculated by the average calculator 721 and the center wavelength. However, the average calculator may calculate the average value by averaging the sampling value according to the displacement of the time-series measurement surface after calculating the sampling value according to the displacement of the measurement surface based on the sampling value according to the interference light acquired by the sampling unit 71 and the center wavelength. In short, it is only required that the average calculator calculates the average value by averaging the time-series sampling value acquired by the sampling unit in accordance with the sampling frequency.

What is claimed is:

1. A laser interferometer, comprising: a laser source for emitting a laser beam, a reference surface provided at a predetermined position for reflecting the laser beam; and a measurement surface provided on a target object for reflecting the laser beam, the laser interferometer measuring a displacement of the target object by calculating a displacement of the measurement surface based on an interference light reflected by the reference surface and the measurement surface, wherein the laser source emits the laser beam while stabilizing a center wavelength of the laser beam by modulating the laser beam using a modulation signal of a predetermined frequency, the laser interferometer further comprising: a sampling unit that acquires a sampling value by sampling the interference light in accordance with a sampling frequency that is a multiple of an integer of two or more of a frequency of the modulation signal; and an average calculator that calculates an average value by averaging the sampling value in time-series acquired by the sampling unit in accordance with the sampling frequency, a displacement of the measurement surface being measured based on the average value calculated by the average calculator.

2. The laser interferometer according to claim 1, wherein the average calculator calculates an average value every time the sampling unit acquires sampling values of a number corresponding to the sampling frequency.

3. The laser interferometer according to claim 1, wherein the average calculator calculates a moving average value of intervals corresponding to the sampling frequency.

* * * * *